Sept. 30, 1941. A. J. ROSENBERGER 2,257,577
PRESSURE SENSITIVE INSTRUMENT
Filed June 29, 1939 3 Sheets-Sheet 1

Inventor
Albert J. Rosenberger
by McConkey Dawson & Booth
Attorneys

Sept. 30, 1941.  A. J. ROSENBERGER  2,257,577

PRESSURE SENSITIVE INSTRUMENT

Filed June 29, 1939  3 Sheets-Sheet 2

Inventor
Albert J. Rosenberger
by McConkey Dawson Booth
Attorneys

Inventor
Albert J. Rosenberger
by McConkey Dawson & Booth
Attorneys

Patented Sept. 30, 1941

2,257,577

UNITED STATES PATENT OFFICE 2,257,577

PRESSURE SENSITIVE INSTRUMENT

Albert J. Rosenberger, Chicago, Ill., assignor to Republic Flow Meters Company, Chicago, Ill., a corporation of Illinois Application June 29, 1939, Serial No. 281,903

14 Claims. (Cl. 73—31)

This invention relates to sensitive instruments and more particularly to instruments for producing a controlled pressure proportional to a square or square root function of a controlling pressure.

One of the objects of the invention is to provide a liquid sealed instrument which is entirely unaffected by the amount of sealing liquid employed. Other factors such as the relative areas of the tubes or passages sealed by the liquid likewise have no effect on the accuracy of the instrument.

Another object of the invention is to provide an instrument for automatically creating a force proportional to a square or square root function of an applied force. This is useful in measuring or controlling fluid flow by pressure drop across an orifice and in other applications where a square or square root function is desired.

Other objects, advantages and novel features of the invention including desirable structural arrangements and uses will be apparent from the following description of the accompanying drawings, in which.

Figure 1:
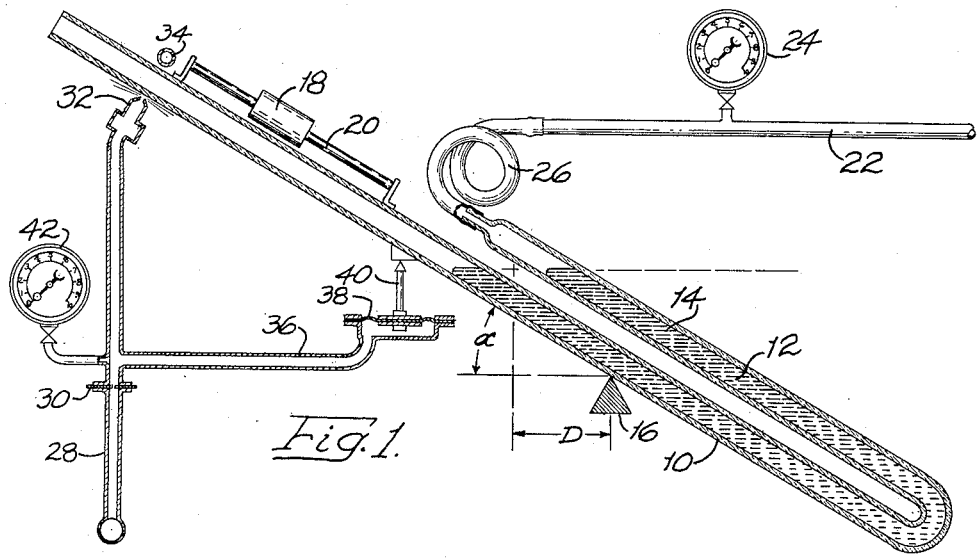
Figures 1 and 2 are diagrammatic views illustrating the principles of the invention.
Figure 2:
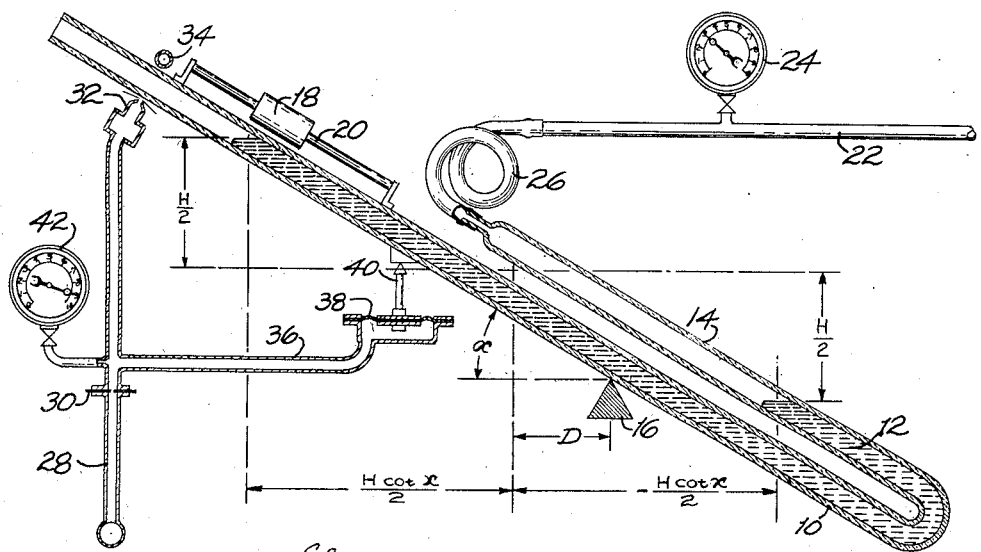

As indicated in Figures 1 and 2 the invention includes a pair of parallel tubes 10 and 12 intercommunicating at one end and adapted to contain a sealing liquid 14 such as mercury or the like. The tubes are pivotally mounted on a fixed support 16 intermediate their ends and one of them carries a weight 18 slidable on a bar 20 to balance the instrument for zero. A controlling pressure or pressure to be squared is conducted to the instrument through a pipe 22 having a pressure gage 24 and connected through a flexible section 26 to the upper end of the pipe 12.

Pressure introduced through the pipe 22 tends to displace the sealing liquid and disturb the balance of the tubes and means are provided to create a compensating force tending to rebalance the tubes. As shown such means comprises a fluid pressure supply conduit 28 communicating through a restriction 30 with a fixed bleed orifice 32 mounted adjacent the pipe 10. Preferably a fixed stop 34 is arranged opposite the nozzle to limit swinging of the pipe away from the nozzle. The pipe 28 between the restriction 30 and orifice 32 communicates through a pipe 36 with the under side of a flexible diaphragm 38 which carries a stem 40 pressing against the pipe 10 at the upper side of the support 16. A gage 42 may also be connected to the pipe 28 to indicate the pressure therein.

In use the tubes are balanced in the position shown at an angle $\alpha$ to the horizontal by adjusting the weight 18 with no pressure in the pipe 22. When pressure is admitted to the tube 12 through pipe 22 it depresses the liquid level therein and causes a corresponding increase in level in the tube 10. The increased weight of liquid to the left of the fulcrum causes the tubes to tilt counterclockwise to restrict the orifice 32 thereby increasing the pressure in pipe 28. This increased pressure acting on the diaphragm 38 tends to turn the tubes in a clockwise direction and will be controlled through the orifice 32 to balance exactly the turning force exerted by the displaced sealing liquid.

Considering the applied pressure equal to a head H and the zero level of the liquid at a distance D from the pivot 16, the weight of the displaced liquid in each tube will be $$\frac{H}{2 \sin \alpha} Ar$$

in which A is the cross-sectional area of the tubes and $r$ is the liquid density. Assuming forces tending to turn the tubes in a counterclockwise direction to be positive and those tending to turn the tubes clockwise to be negative, the moment produced by rise of sealing liquid in the low pressure tube 10 is:

$$M_L = \left(D + \frac{1}{2}\frac{H \cot \alpha}{2}\right)\left(\frac{H}{2 \sin \alpha} Ar\right)$$

The moment produced by the lowering of liquid in the high pressure tube 12 is:

$$M_H = -\left(D - \frac{1}{2}\frac{H \cot \alpha}{2}\right)\left(\frac{H}{2 \sin \alpha} Ar\right)$$

The total moment is:

$$M = M_L + M_H = \left(D + \frac{1}{2}\frac{H \cot \alpha}{2}\right)\left(\frac{H}{2 \sin \alpha} Ar\right)$$
$$-\left(D - \frac{1}{2}\frac{H \cot \alpha}{2}\right)\left(\frac{H}{2 \sin \alpha} Ar\right)$$
$$= \frac{H}{2 \sin \alpha} Ar \left(D + \frac{1}{2}\frac{H \cot \alpha}{2} - D + \frac{1}{2}\frac{H \cot \alpha}{2}\right)$$
$$= \frac{H^2 \cot \alpha}{4 \sin \alpha} Ar$$
$$= CH^2$$

where C is a constant equal to $$\frac{\cot \alpha}{4 \sin \alpha} Ar$$

These equations are true regardless of the amount of sealing liquid in the tubes as long as the tubes are balanced with no pressure therein. Thus careful measuring of the amount of mercury required is eliminated, it being necessary only to use enough mercury to maintain a seal between the tubes at the maximum applied pressure.

If the cross-sectional areas of the tubes are unequal and are respectively $A_{10}$ and $A_{12}$ the change in level of each leg is inversely proportional to the areas. Since zero level has been shown to have no effect, it may be disregarded and the equations become:

$$W_H = H \frac{A_{12}}{(A_{10}+A_{12}) \sin \alpha} A_{10} r = \frac{Hr}{\sin \alpha} \cdot \frac{A_{10} A_{12}}{A_{10}+A_{12}}$$

$$W_L = H \frac{A_{10}}{(A_{10}+A_{12}) \sin \alpha} A_{12} r = \frac{Hr}{\sin \alpha} \cdot \frac{A_{10} A_{12}}{A_{10}+A_{12}}$$

where $W_H$ and $W_L$ are the weights of liquid displaced in the respective tubes.

$$M_H = -\left(\frac{H \cot \alpha}{2} \cdot \frac{A_{12}}{A_{10}+A_{12}}\right)\left(\frac{Hr}{\sin \alpha} \cdot \frac{A_{10} A_{12}}{A_{10}+A_{12}}\right)$$

$$M_L = \left(\frac{H \cot \alpha}{2} \cdot \frac{A_{10}}{A_{10}+A_{12}}\right)\left(\frac{Hr}{\sin \alpha} \cdot \frac{A_{10} A_{12}}{A_{10}+A_{12}}\right)$$

$$M = M_L - M_H = \left(\frac{Hr}{\sin \alpha} \cdot \frac{A_{10} A_{12}}{A_{10}+A_{12}}\right)$$

$$\left(\frac{H \cot \alpha}{2} \cdot \frac{A_{12}}{A_{10}+A_{12}} + \frac{H \cot \alpha}{2} \cdot \frac{A_{10}}{A_{10}+A_{12}}\right)$$

$$= \left(\frac{Hr}{\sin \alpha} \cdot \frac{A_{10} A_{12}}{A_{10}+A_{12}}\right) \frac{H \cot \alpha}{2}$$

$$= \frac{H^2 r \cot \alpha}{2 \sin \alpha} \cdot \frac{A_{10} A_{12}}{A_{10}+A_{12}}$$

$$= KH^2$$

where K is a constant equal to $$\frac{\frac{1}{2} A_{10} A_{12} r \cot \alpha}{[A_{10}+A_{12}] \sin \alpha}$$

Thus the tubes need not be of the same area and the total moment will still be proportional to the square of the applied pressure.

Figure 3:
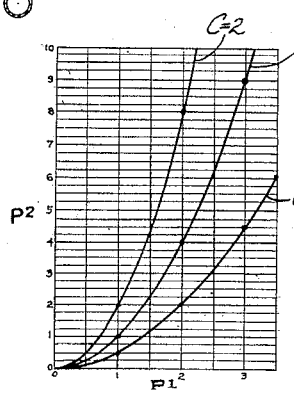
Figure 3 is a chart illustrating the characteristics of the instrument.

The curves of Figure 3 illustrate the relationship between the pressure in pipe 22, plotted as $P_1$ and in pipe 28, plotted as $P_2$. The center curve corresponds exactly to a square curve such as would be true if the constant C or K equals 1. It will readily be apparent that the shape of the curve will change as the value of the constants changes to give a steeper or flatter curve but one which is always proportional to a square curve. Two such curves are shown with values of C of 2 and ½ respectively.

Figure 4:
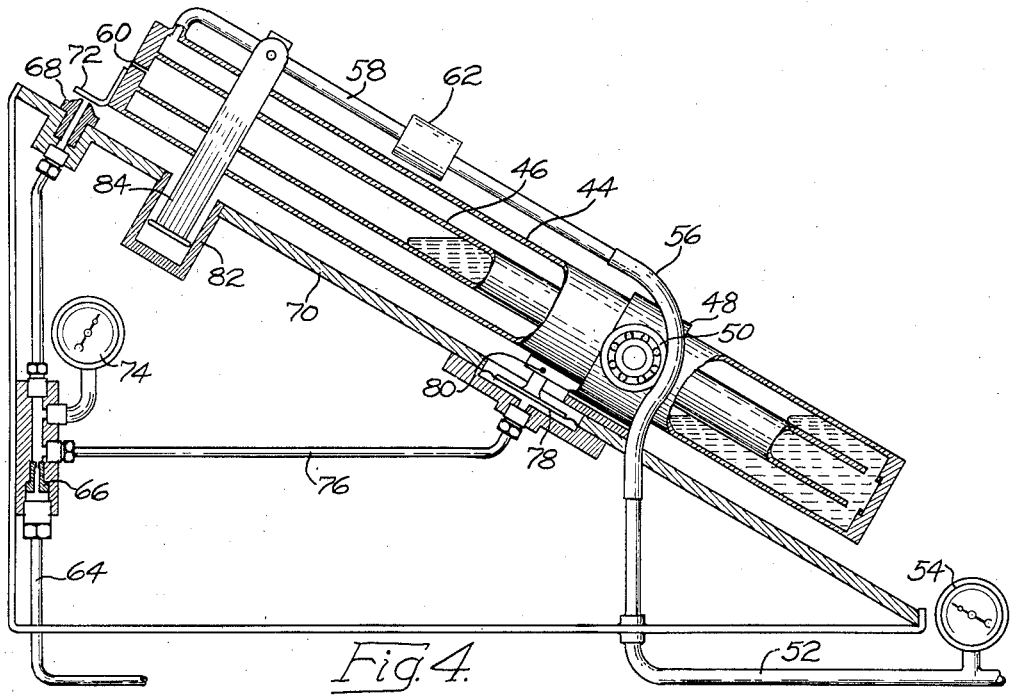
Figure 4 is a side view with parts in section of an instrument embodying the invention.

Figure 4 illustrates a practical instrument construction according to the invention and including concentric tubes 44 and 46 connected at their upper ends and communicating at their lower ends. A collar 48 around the outer tube 44 carries spindles horizontally pivoted in roller bearings 50 to provide a fulcrum for the tubes. Pressure conducted in through a tube 52 having a gage 54 thereon is led through a flexible section 56 adjacent the roller bearing mounting and through a tube 58 paralleling and above the tube 44. The tube 58 may be connected to either of the tubes 44 or 46 but for convenience of construction is preferably connected to the upper end of the outer tube 44, an air vent 60 being provided at the upper end the inner tube. The balance weight 62 may conveniently be mounted on the tube 58 for sliding thereon to adjust the zero position of the instrument.

A constant source of pressure led in through a pipe 64 passes through a restriction 66 and to a fixed bleed orifice 68 mounted on a supporting plate 70. The tubes carry a vane member 72 registering with the orifice and movable toward and away therefrom as the tubes tilt to vary the pressure above the restriction 66. A suitable gage 74 is preferably provided to indicate the pressure above the restriction and this pressure is conducted through a pipe 76 to a lower side of a flexible diaphragm 78 secured over an opening in the supporting plate 70. The diaphragm is pivotally connected at 80 to the tubes to the left of the pivotal mounting.

The operation of this construction is exactly as described in connection with the diagrammatic illustration in Figures 1 and 2. However, due to the concentric arrangements of the tubes 44 and 46 any possible error due to unequal distances of the tubes from the pivotal mounting is cancelled out. As explained above the pressure above the restriction 66 will be proportional to the square of that in the pipe 52.

Preferably in order to prevent undue vibration or fluttering the plate 70 supports a dash pot cylinder 82 in which a piston 84 is loosely mounted. The piston 84 is shown pivotally connected to the tube 58. The dash pot cylinder may contain oil or other liquid if desired and will serve to dampen out sudden surges or vibrations tending to swing the tubes violently.

Figure 5:
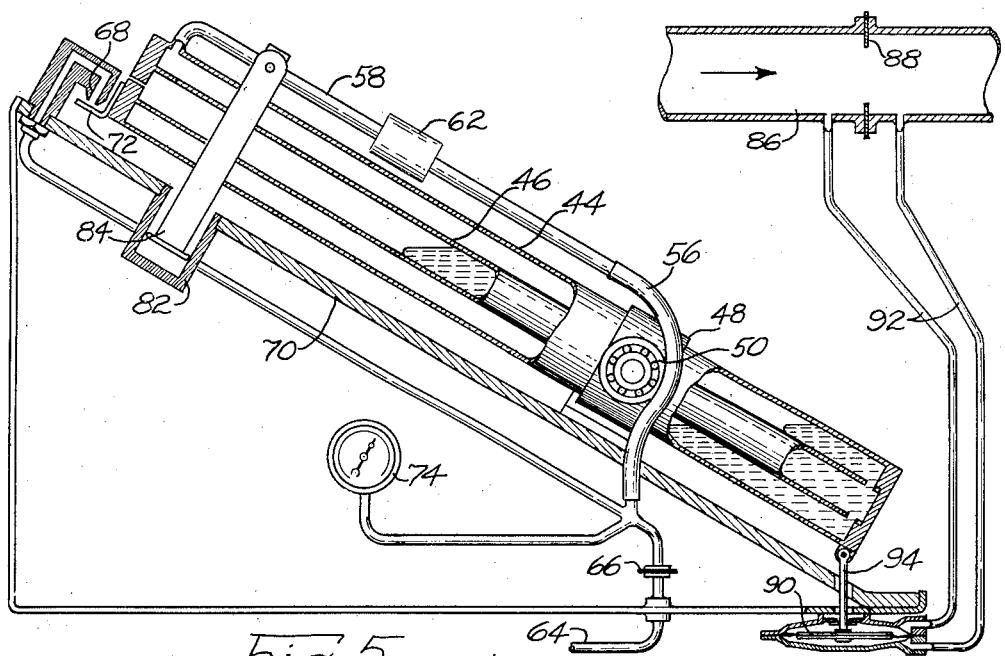
Figure 5 is a view similar to Figure 4 illustrating application of the invention to a flowmeter.

Figure 5 illustrates an application of the invention to a fluid flow meter, parts therein corresponding to like parts in Figure 4 being indicated by the same reference numerals. The instrument is shown connected to indicate the rate of fluid flow through a conduit 86 having an orifice 88 therein. A flexible diaphragm 90 is connected through pipes 92 to the conduit on opposite sides of the orifice and a link 94 connects the diaphragm to the lower end of the tubes 44 and 46. Differential pressure across the orifice due to flow therethrough tends to pull the lower end of the tubes downwardly. The pipe 64 leads through restriction 66 to both the bleed orifice 68 and to the pipe 58 which communicates with the upper end of the outer tube 44. It will be noted that the orifice 68 is reversed so that clockwise movement of the tubes tends to close rather than to open it.

In operation flow through the conduit 86 tends to rock the tubes clockwise and restrict the orifice 68. This increases the pressure above the restriction 66 and in the tube 58 causing displacement of the sealing liquid to create a moment tending to rock the tubes in a counterclockwise direction. When this moment balances the force exerted by the diaphragm 90 the tubes will again be in balance.

Since the force required to balance the moment caused by displacement of the sealing liquid is proportional to the square of the pressure causing unbalance of the sealing liquid, it will be apparent that the pressure in the pipe 64 above the restriction and in the tube 58 is proportional to the square root of the force exerted by the diaphragm 90. Since the rate of flow through a conduit is proportional to the square root of the pressure drop across a restriction in the conduit, the pressure above the restriction 66 in pipe 64 will be directly proportional to the rate of flow through the conduit. Thus by proper calibration of the pressure gage 74 the rate of flow through the conduit 86 can be read directly.

Figure 6:
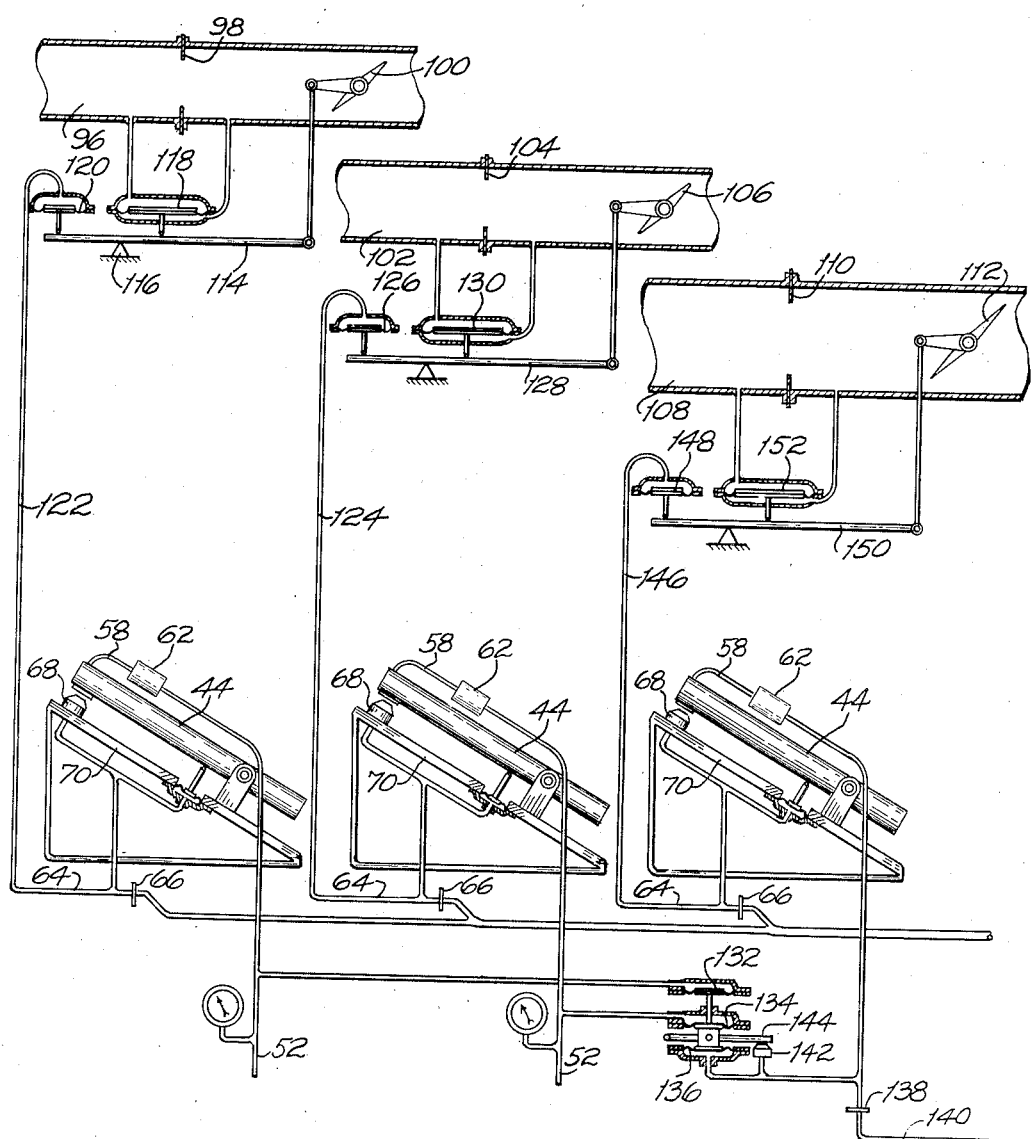
Figure 6 is a diagram illustrating application of the invention to a flow proportioning system.

Figure 6 illustrates an application of the instrument of Figure 4 to the proportional control of three fluids; for example, two fuels and an air supply. As shown one fuel may be supplied through a conduit 96 having a restriction 98 and a valve 100 therein. The second fuel may be supplied through a conduit 102 having a restriction 104 and a valve 106 therein. Air for combustion of the two fuels may be supplied through a conduit 108 having a restriction 110 having a valve 112 therein.

The valve 100 is connected to one end of a balance lever 114 pivoted at 116 and having a diaphragm 118 whose opposite sides are connected across the restriction 98 engaging the balance lever on one side of its pivot.

A diaphragm 120 engages the balance lever 114 on the opposite side of its pivot and is connected through a pipe 122 to the pipe 64 above the restriction 66. Any desired controlling pressure such as a master loading pressure from a master regulator may be conducted into the pipe 52 to communicate with the tube 44 through the tube 58.

Since the pressure produced in the pipe 64 above the restriction is proportional to the square of the master loading pressure led in through the pipe 52 and since the force exerted by diaphragm 118 is proportional to the square of the rate of flow through the conduit 96 it will be apparent that the valve 100 will be controlled to produce a flow through the conduit 96 directly proportional to the master loading pressure.

The flow through the conduit 102 is similarly controlled by a master loading pressure led in through the corresponding pipe 52 to the outer tube 44 of the corresponding instrument. The pressure produced in the pipe 64 of this instrument above its restriction 66 is conducted through a pipe 124 to a diaphragm 126 acting on a balance lever 128 which is connected to the valve 106. The force of the diaphragm 126 is balanced by a diaphragm 130 connected across the orifice 104. The two master loading pressures controlling the separate fuels are conducted respectively to interconnected diaphragms 132 and 134 which act against a diaphragm 136. With this arrangement the force exerted by diaphragm 136 must equal the algebraic sum of the forces exerted by the diaphragms 132 and 134. The diaphragm 136 is connected through a restriction 138 to a constant source of air or the like under pressure shown at 140 and a bleed valve 142 is connected to the pipe 140 above the restriction therein to be controlled by a movable vane 144 which is mounted to be moved by the diaphragms 132, 134 and 136. The pipe 140 above the restriction is also connected to the tube 58 of an instrument arranged to control the air supply and which is identical in all respects with the instrument of Figure 4. The pipe 64 of this instrument is connected by a pipe 146 to a flexible diaphragm 148 acting on one end of a balance lever 150 which is connected to the valve 112. The diaphragm 148 is balanced by a diaphragm 152 connected to the air supply conduit 108 across the orifice 110. In operation the flow of the two fuels through the conduits 96 and 102 will be maintained exactly proportional to the controlling pressures conducted in through the pipes 52 and the air supply through conduit 108 will be maintained directly proportional to the algebraic sum of the fuel flows. Since the pressure in pipe 140 above the restriction 138 is maintained proportional to the algebraic sum of the two loading pressures through the arrangement of the diaphragms 132, 134 and 136, and since the valve 112 is controlled to maintain air flow through the conduit directly proportional to the pressure in pipe 140 above the restriction, it will be apparent that this condition is necessarily true.

While several embodiments of the invention have been shown and described in detail, it will be apparent that numerous changes might be made and it is not intended that the illustrated embodiments shall be taken as a definition of the scope of the invention, reference being had for this purpose to the appended claims.

What is claimed is:

1. A sensitive instrument comprising a pair of tubes arranged in substantially parallel relationship, means pivotally mounting said tubes at an angle to the horizontal, means connecting said tubes at their lower ends, the lower ends of the tubes and said connecting means containing a sealing liquid, means for conducting fluid pressure into the upper end of one of said tubes to displace the sealing liquid in the tubes and unbalance the tubes about their pivotal mounting, and means responsive to the unbalance of the tubes to create a force tending to rebalance the tubes.

2. A sensitive instrument comprising a pair of tubes arranged in substantially parallel relationship, means pivotally mounting said tubes at an angle to the horizontal, means connecting said tubes at their lower ends, the lower ends of the tubes and said connecting means containing a sealing liquid, means for creating a force tending to unbalance the tubes about their pivotal mounting, and means responsive to unbalancing of the tubes by said first named force for creating a counteracting force tending to rebalance the tubes, one of said two last named means including means for varying the pressure in the upper end of one of said tubes to displace the sealing liquid in the tubes.

3. A sensitive instrument comprising a pair of tubes arranged in substantially parallel relationship, means pivotally mounting said tubes at an angle to the horizontal, means connecting said tubes at their lower ends, the lower ends of the tubes and said connecting means containing a sealing liquid, an adjustable weight carried by the tubes for balancing the tubes about their pivotal mounting, means for creating a force tending to unbalance the tubes about their pivotal mounting, and means responsive to unbalancing of the tubes by said first named force for creating a counteracting force tending to rebalance the tubes, one of said two last named means including means for varying the pressure in the upper end of one of said tubes to displace the sealing liquid in the tubes.

4. A sensitive instrument comprising a pair of tubes arranged in substantially parallel relationship, means pivotally mounting said tubes at an angle to the horizontal, means connecting said tubes at their lower ends, the lower ends of the tubes and said connecting means containing a sealing liquid, means for creating a force tending to unbalance the tubes about their pivotal mounting, and means responsive to unbalancing of the tubes by said first named force for creating a counteracting force tending to rebalance the tubes, one of said two last named means including means controlled by unbalancing of the tubes for controlling an actuating force, and means responsive to said actuating force for acting on said tubes to urge them in one direction about their pivotal axis.

5. A sensitive instrument comprising a pair of tubes arranged in substantially parallel relationship, means pivotally mounting said tubes at an angle to the horizontal, means connecting said tubes at their lower ends, the lower ends of the tubes and said connecting means containing a sealing liquid, means for creating a force tending to unbalance the tubes about their pivotal mounting, and means responsive to unbalancing of the tubes by said first named force for creating a counteracting force tending to rebalance the tubes, one of said two last named means including means controlled by unbalancing of the tubes for controlling an actuating pressure, and means for conducting said actuating pressure to the upper end of one of the tubes to displace the sealing liquid in the tubes.

6. A sensitive instrument comprising a pair of tubes arranged in substantially parallel relationship, means pivotally mounting said tubes at an angle to the horizontal, means connecting said tubes at their lower ends, the lower ends of the tubes and said connecting means containing a sealing liquid, means for creating a force tending to unbalance the tubes about their pivotal mounting, and means responsive to unbalancing of the tubes by said first named force for creating a counteracting force tending to rebalance the tubes, one of said two last named means including means controlled by unbalancing of the tubes for controlling an actuating pressure, and a pressure responsive device responsive to the actuating pressure for urging the tubes in one direction about their pivotal mounting.

7. A sensitive instrument comprising a pair of tubes arranged concentrically and communicating at one end, a support for pivotally mounting said tubes at an angle to the horizontal with said one end down to receive a sealing liquid, means to create a force tending to unbalance the tubes about their pivotal mounting, and means responsive to unbalance of the tubes to create a counter force tending to rebalance the tubes, one of said means including means to conduct fluid pressure to the top of one of said tubes to displace the sealing liquid.

8. A sensitive instrument comprising a pair of tubes arranged concentrically and communicating at one end, a support for pivotally mounting said tubes at an angle to the horizontal with said one end down to receive a sealing liquid, means to create a force tending to unbalance the tubes about their pivotal mounting, and means responsive to unbalance of the tubes to create a counter force tending to rebalance the tubes, one of said means including a fluid pressure conduit terminating in a stationary bleed orifice and a member carried by the tubes and moved toward and away from said orifice.

9. A sensitive instrument comprising a pair of tubes arranged concentrically and communicating at one end, a support for pivotally mounting said tubes at an angle to the horizontal with said one end down to receive a sealing liquid, means to create a force tending to unbalance the tubes about their pivotal mounting, and means responsive to unbalance of the tubes to create a counter force tending to rebalance the tubes, one of said means including a fluid pressure conduit terminating in a stationary bleed orifice and a member carried by the tubes and moved toward and away from said orifice, and a pressure responsive device communicating with the conduit anterior to the orifice and connected to the tubes to urge the tubes in one direction about their pivotal mounting.

10. A sensitive instrument comprising a pair of tubes arranged concentrically and communicating at one end, a support for pivotally mounting said tubes at an angle to the horizontal with said one end down to receive a sealing liquid, means to create a force tending to unbalance the tubes about their pivotal mounting, and means responsive to unbalance of the tubes to create a counter force tending to rebalance the tubes, one of said means including a fluid pressure conduit terminating in a stationary bleed orifice and a member carried by the tubes and moved toward and away from said orifice, and a connection from the conduit anterior to the orifice to the upper end of one of the tubes to displace the sealing liquid.

11. A sensitive instrument comprising a pair of substantially parallel tubes connected at one end, a support pivotally mounting the tubes at an angle to the horizontal with said one end down to receive a sealing liquid, means to conduct a fluid pressure into the upper end of one of the tubes to displace the sealing liquid thereby to create a force tending to turn the tubes in one direction, and means to create a counterbalancing force on the tubes tending to turn them in the other direction, said counterbalancing force being proportional to the square of the fluid pressure.

12. A sensitive instrument comprising a pair of substantially parallel tubes connected at one end, a support pivotally mounting the tubes at an angle to the horizontal with said one end down to receive a sealing liquid, means to conduct a fluid pressure into the upper end of one of the tubes to displace the sealing liquid thereby to create a force tending to turn the tubes in one direction, a supply pipe terminating in a bleed orifice, a member moved toward and away from the orifice by the tubes to control the pressure in the pipe, and pressure responsive means connected to the supply pipe and acting on the tubes tending to turn the tubes in the other direction.

13. An instrument for measuring the flow of fluid through a conduit having an obstruction therein comprising a pair of substantially parallel tubes communicating at one end, a support pivotally mounting the tubes at an angle to the horizontal with said one end down to receive a sealing liquid, means responsive to the differential pressure across said obstruction to urge said tubes in one direction, means to conduct a balancing pressure into the upper end of one of said tubes to displace the sealing liquid an amount sufficient to balance the force of said first named means, and means to indicate said balancing pressure, the balancing pressure varying directly with flow through the conduit.

14. An instrument for measuring the flow of fluid through a conduit having an obstruction therein comprising a pair of substantially parallel tubes communicating at one end, a support pivotally mounting the tubes at an angle to the horizontal with said one end down to receive a sealing liquid, means responsive to the differential pressure across said obstruction to urge said tubes in one direction, a supply pipe leading from a pressure source and terminating in a bleed orifice, a member moved toward and away from the orifice by said tubes to control the pressure in the pipe, means to connect the pipe to the upper end of one of said tubes, and means to indicate the pressure in the supply pipe.

ALBERT J. ROSENBERGER.